(12) United States Patent
Newport et al.

(10) Patent No.: US 11,591,891 B2
(45) Date of Patent: Feb. 28, 2023

(54) HELIX HUB WITH IMPROVED TWO-PHASE SEPARATION

(71) Applicant: Halliburton Energy Services, Inc., Houston, TX (US)

(72) Inventors: Casey Laine Newport, Tulsa, OK (US); Donn Jason Brown, Broken Arrow, OK (US); Ketankumar Kantilal Sheth, Tulsa, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 31 days.

(21) Appl. No.: 17/354,535

(22) Filed: Jun. 22, 2021

(65) Prior Publication Data
US 2022/0349293 A1 Nov. 3, 2022

Related U.S. Application Data

(60) Provisional application No. 63/181,602, filed on Apr. 29, 2021.

(51) Int. Cl.
*E21B 43/38* (2006.01)
*B01D 19/00* (2006.01)
*E21B 43/12* (2006.01)

(52) U.S. Cl.
CPC .......... *E21B 43/38* (2013.01); *B01D 19/0057* (2013.01); *E21B 43/126* (2013.01)

(58) Field of Classification Search
CPC .......... E21B 43/13; E21B 43/34; E21B 43/38; E21B 43/126; E21B 43/128
See application file for complete search history.

(56) References Cited

U.S. PATENT DOCUMENTS

| | | | |
|---|---|---|---|
| 4,481,020 A | 11/1984 | Lee et al. | |
| 5,431,228 A * | 7/1995 | Weingarten | B01D 19/0057 166/69 |
| 6,113,675 A * | 9/2000 | Branstetter | B01D 19/0052 96/196 |
| 10,107,274 B2 | 10/2018 | Noui-Mehidi et al. | |
| 10,371,154 B2 | 8/2019 | Jayaram et al. | |
| 2002/0174982 A1* | 11/2002 | Weingarten | E21B 43/38 166/69 |
| 2020/0362649 A1 | 11/2020 | Brown et al. | |

OTHER PUBLICATIONS

International Search Report and Written Opinion issued in related PCT Application No. PCT/US2021/038877 dated Jan. 21, 2022, 10 pages.

* cited by examiner

*Primary Examiner* — David Carroll
(74) *Attorney, Agent, or Firm* — Conley Rose, P.C.; Rodney B. Carroll

(57) ABSTRACT

Pumping of wellbore fluid to a surface may have a detrimental effect on the pump performance due to high gas concentrations in the fluid. A pump system that utilizes a helix gas separator provides greater pump efficiency by effectively removing the gas phase of the fluid. The wellbore fluid received at a pump system is directed from an intake to a gas separator that utilizes a stationary auger. The stationary auger induces rotational motion of the wellbore fluid causing the wellbore fluid to separate into a gas phase and a liquid phase. The stationary auger utilizes a tapered diameter and an opening between one or more helixes or vanes to separate a gas phase more efficiently from a liquid phase of a fluid.

13 Claims, 4 Drawing Sheets

HELIX HUB WITH IMPROVED TWO-PHASE SEPARATION

CROSS-REFERENCE TO RELATED APPLICATION

The present application claims benefit of U.S. Provisional Application No. 63/181,602, filed Apr. 29, 2021, which is incorporated herein by reference in its entirety for all purposes.

TECHNICAL FIELD OF THE INVENTION

The present disclosure relates generally to separation of gas and liquid phases of downhole fluids and more particularly to a gas separator system to induce fluid rotation of fluid in a wellbore.

BACKGROUND

Hydrocarbons, such as oil and gas, are produced or obtained from subterranean reservoir formations that may be located onshore or offshore. The development of subterranean operations and the processes involved in removing hydrocarbons from a subterranean formation typically involve a number of different steps such as drilling a wellbore at a desired well site, treating the wellbore to optimize production of hydrocarbons, performing the necessary steps to produce the hydrocarbons from the subterranean formation, and pumping the hydrocarbons to the surface of the earth.

When performing subterranean operations, pump systems, for example, electrical submersible pump (ESP) systems, may be used when reservoir pressure alone is insufficient to produce hydrocarbons from a well. Presence of gas or free gas in a reservoir or fluid of a wellbore and the resulting multiphase flow behavior of the fluid has a detrimental effect on pump performance and pump system cooling. Economic and efficient pump operations may be affected by gas laden fluid. The presence of gas in a pump causes a drop in pressure created within the pump stages, reducing output of the pump. High concentrations of gas within a pump can create a condition commonly referred to as "gas lock", where gas is so prominent with the stages of the pump, the intended production liquid no longer reaches the surface. Separation of gas from the liquid phase of the fluid before entry into the pump improves pump performance, decreases pump vibration, and reduces the operating temperature of the pump. Traditional rotary and vortex gas separators rely on rotating components to separate the two phases, a process which is limited by fluid velocities while requiring an increase in system horsepower requirements and increase erosion possibilities within the separation chamber. Erosion (which is a function of particle velocity as particles make contact with rotating paddles in a traditional vortex and rotary separator systems) cuts through separation chamber walls and housing, thus parting the pump string downhole. An effective, efficient and reliable pump gas separation system is needed.

Figure 1:
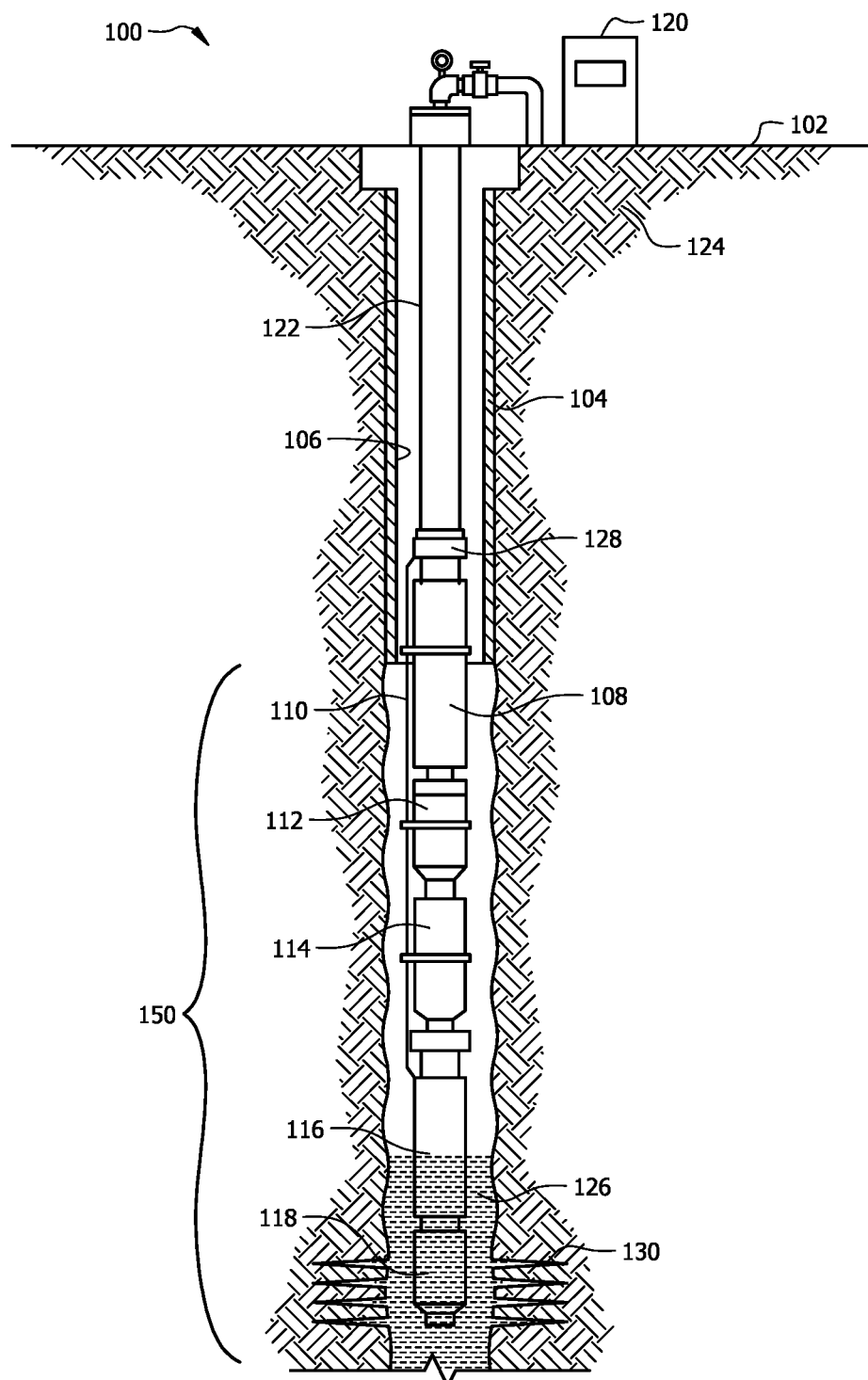
FIG. 1 is an illustrative well environment, according to one or more aspects of the present disclosure.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

Traditional gas separators required a spinning or moving component or element to impart or induce a rotational flow of the downhole fluid to separate the different phases of the downhole fluid so that the pump only receives a liquid phase of the downhole fluid. However, moving components or elements experience wear and tear and increase overall costs of a system. According to one or more embodiments of the present disclosure, a gas separator of a pump system utilizes fewer movable components to provide efficient separation of the gas phase and the liquid phase of a downhole fluid. For example, a stationary auger induces fluid rotation and centrifugal separation of the gas phase and liquid phase of the downhole fluid. The stationary auger is used as the primary means to induce fluid rotation. As the separator utilizes a stationary auger, the separator is not limited in flow rate by the downhole fluid moving device as a high flow fluid moving device can be utilized and is not limited by a rotary separation element as the inducer is static. The gas separator is mechanically simpler, and more effective, than those used in traditional pump systems such as ESP systems.

A gas separator, for example, a helix gas separator, according to one or more embodiments of the present disclosure, utilizes a stationary auger as a primary device to induce rotation of fluid received from the wellbore. The helix gas separator comprises a housing, an intake at one end of the housing, a discharge or crossover at an opposite end which can be coupled to the intake of a pump, a stationary auger disposed or positioned inside the housing, a space or mechanism for allowing a rotating shaft to pass through the center of the housing, a fluid moving device or fluid mover and any one or more other separating components or supports within the housing. The fluid received from the wellbore is forced into an intake by the fluid pressure moving into the fluid moving device. The fluid moving device causes a flow of the fluid stream so that the fluid flows through the stationary auger which induces rotational motion in the fluid through the interaction of the fluid with one or more vanes of the stationary auger in the separation chamber. As a result, a gas phase of the fluid moves to the inside of the separation chamber and exits to the wellbore through the crossover and discharge ports at a discharge end of the helix gas separator. The liquid phase moves to the outside of the separation chamber and enters the intake of the pump through the discharge end of the separator. The helix gas separator is more efficient as the helix gas separator has fewer moving components and rotational motion is induced by the interaction of the moving fluid with the stationary auger. The intake and stationary auger flow channels are designed such that the pressure drop across the intake and the auger flow channels is smaller than the pressure drop across the crossover and discharge ports. A fluid moving device is used with the gas separator to prevent fluid from being drawn into the helix gas separator through the discharge ports.

The helix gas separator of the present disclosure provides efficient and economical separation of gas from a gas laden fluid, for example, one or more downhole fluids associated with a hydrocarbon recovery or production operation. Traditional rotary and vortex separator designs include many moving components and these moving components are subjected to one or more abrasive downhole materials, for example, sand. Contact with such abrasive materials causes erosion to the moving components. The helix gas separator, according to one or more embodiments, reduces wear and tear due to erosion by utilizing a stationary auger which reduces maintenance and replacement costs as the number of moving components is minimized. Additionally, the intake and stationary auger flow channels are configured such that the pressure drop across them is smaller than the pressure drop across the crossover and exit ports and/or a fluid moving device is used within the gas separator and located between the separator intake and stationary auger to prevent fluid from being drawn into the separator through exit ports. Further, using the stationary auger as a separation inducer results in the ability to use a high flow fluid moving device which results in higher achievable flow rate through the gas separator. Using a stationary auger enhances the separation of a gas phase and a liquid phase from the wellbore fluid as the flow rate increases.

Illustrative embodiments of the present invention are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time consuming but would nevertheless be a routine undertaking for those of ordinary skill in the art having the benefit of the present disclosure.

Throughout this disclosure, a reference numeral followed by an alphabetical character refers to a specific instance of an element and the reference numeral alone refers to the element generically or collectively. Thus, as an example (not shown in the drawings), widget "1a" refers to an instance of a widget class, which may be referred to collectively as widgets "1" and any one of which may be referred to generically as a widget "1". In the figures and the description, like numerals are intended to represent like elements.

To facilitate a better understanding of the present disclosure, the following examples of certain embodiments are given. In no way should the following examples be read to limit, or define, the scope of the disclosure. Embodiments described below with respect to one implementation are not intended to be limiting.

The terms "couple" or "couples," as used herein are intended to mean either an indirect or direct connection. Thus, if a first device couples to a second device, that connection may be through a direct connection, or through an indirect electrical connection or a shaft coupling via other devices and connections.

FIG. 1 illustrates a well site environment 100, according to one or more aspects of the present invention. While well site environment 100 illustrates a land-based subterranean environment, the present disclosure contemplates any well site environment including a subsea environment. In one or more embodiments, any one or more components or elements may be used with subterranean operations equipment located on offshore platforms, drill ships, semi-submersibles, drilling barges and land-based rigs. In one or more embodiments, well site environment 100 comprises a wellbore 104 below a surface 102 in a formation 124. In one or more embodiments, a wellbore 104 may comprise a nonconventional, horizontal or any other type of wellbore. Wellbore 104 may be defined in part by a casing string 106 that may extend from a surface 102 to a selected downhole location. Portions of wellbore 104 that do not comprise the casing string 106 may be referred to as open hole.

In one or more embodiments, various types of hydrocarbons or fluids may be pumped from wellbore 104 to the surface 102 using a pump system 150 disposed or positioned downhole, for example, within, partially within, or outside casing 106 of wellbore 104. In one or more embodiments, pump system 150 may comprise an electrical submersible pump (ESP) system. Pump system 150 may comprise a pump 108, an electrical cable 110, a separator 112, a seal or equalizer 114, a motor 116, and a sensor 118. The pump 108 may be an ESP, including but not limited to, a multi-stage centrifugal pump, a rod pump, a progressive cavity pump, any other suitable pump system or combination thereof. The pump 108 may transfer pressure to fluid 126 or any other type of downhole fluid to propel the fluid from downhole to the surface 102 at a desired or selected pumping rate. Pump 108 couples to a gas separator 112. Gas separator 112 couples to a seal or equalizer 114 which couples to a motor 116. Motor 116 may be coupled to a downhole sensor 118. In one or more embodiments, an electrical cable 110 is coupled to the motor and to controller 120 at the surface 102. The electrical cable 110 may provide power to the motor 116, transmit one or more control or operation instructions from controller 120 to the motor 116, or both.

In one or more embodiments, fluid 126 may be a multiphase wellbore fluid comprising one or more hydrocarbons. For example, fluid 126 may comprise a gas phase and a liquid phase from a wellbore or reservoir in a formation 124. In one or more embodiments, fluid 126 may enter the wellbore 104, casing 106 or both through one or more perforations 130 in the formation 124 and flow uphole to one or more intake ports of the pump system 150. The pump 108 may transfer pressure to the fluid 126 by adding kinetic energy to the fluid 126 via centrifugal force and converting the kinetic energy to potential energy in the form of pressure. In one or more embodiments, pump 108 lifts fluid 126 to the surface 102.

Fluid pressure in the wellbore 104 causes fluid 126 to enter the gas separator 112. Gas separator 112 separates a gas phase or component from the liquid phase of fluid 126 before the gas phase enters pump 108. In one or more embodiments, motor 116 is an electrical submersible motor configured or operated to turn pump 108 and may, for example, be a two pole, three-phase squirrel cage induction motor or any other motor operable or configurable to turn pump 108. Seal or equalizer 116 may be a motor protector that serves to equalize pressure and keep motor oil separate from fluid 126. In one or more embodiments, a production tubing section 122 may couple to the pump 108 using one or more connectors 128 or may couple directly to the pump 108. In one or more embodiments, any one or more production tubing sections 122 may be coupled together to extend the pump system 150 into the wellbore 104 to a desired or specified location. Any one or more components of fluid 126 may be pumped from pump 108 through production tubing 122 to the surface 102 for transfer to a storage tank, a pipeline, transportation vehicle, any other storage, distribution or transportation system and any combination thereof.

Figure 2:
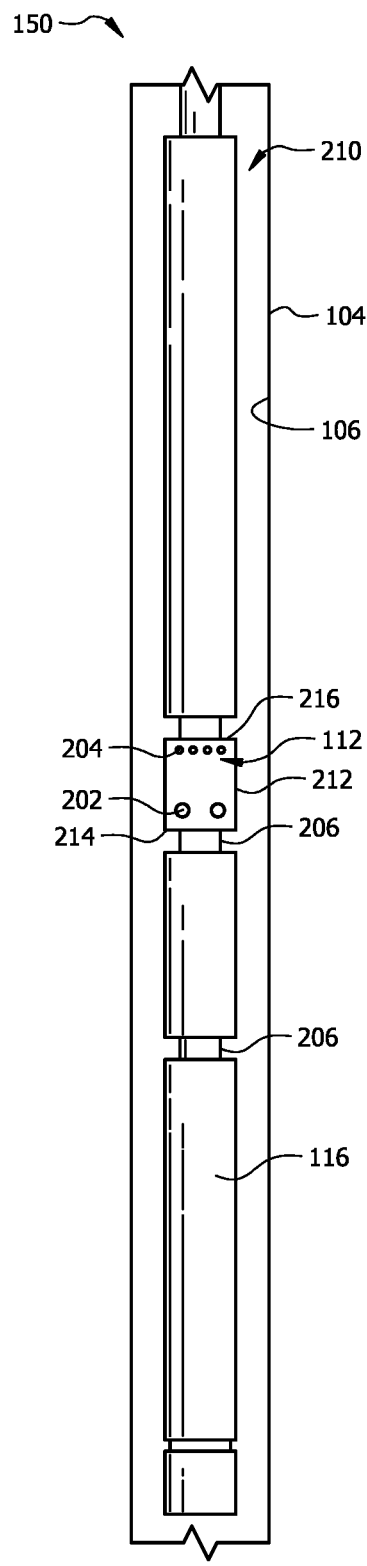
FIG. 2 is an illustrative pump system, according to one or more aspects of the present disclosure.

FIG. 2 is an illustrative pump system 150, according to one or more aspects of the present disclosure. A shaft may run through one or more components or elements of pump system 150 so as to couple the one or more components to one or more other components. The shaft may transmit or communicate rotation of motor 116 to one or more components or elements of gas separator 112. Any one or more components may be coupled via a coupling 206. Gas separator 112 may comprise a housing 212. One or more intake ports 202 may be disposed or positioned at a distal end 214 of the housing 212 and one or more discharge ports 204 may be disposed or positioned at a proximal end 216 of the housing 212. In one or more embodiments, the one or more intake ports 202 and one or more discharge ports 204 may be disposed or positioned circumferentially about the gas separator 112 at a downhole or a distal end 214 and an uphole or a proximal end 216, respectively, of the gas separator 112. The one or more intake ports 202 allow fluid 126 (referring to FIG. 1) to enter the gas separator 112. The one or more discharge ports 204 allow a gas phase or gas component of the fluid 126 to be discharged into an annulus 210 of the casing 106 or wellbore 104.

Figure 3:
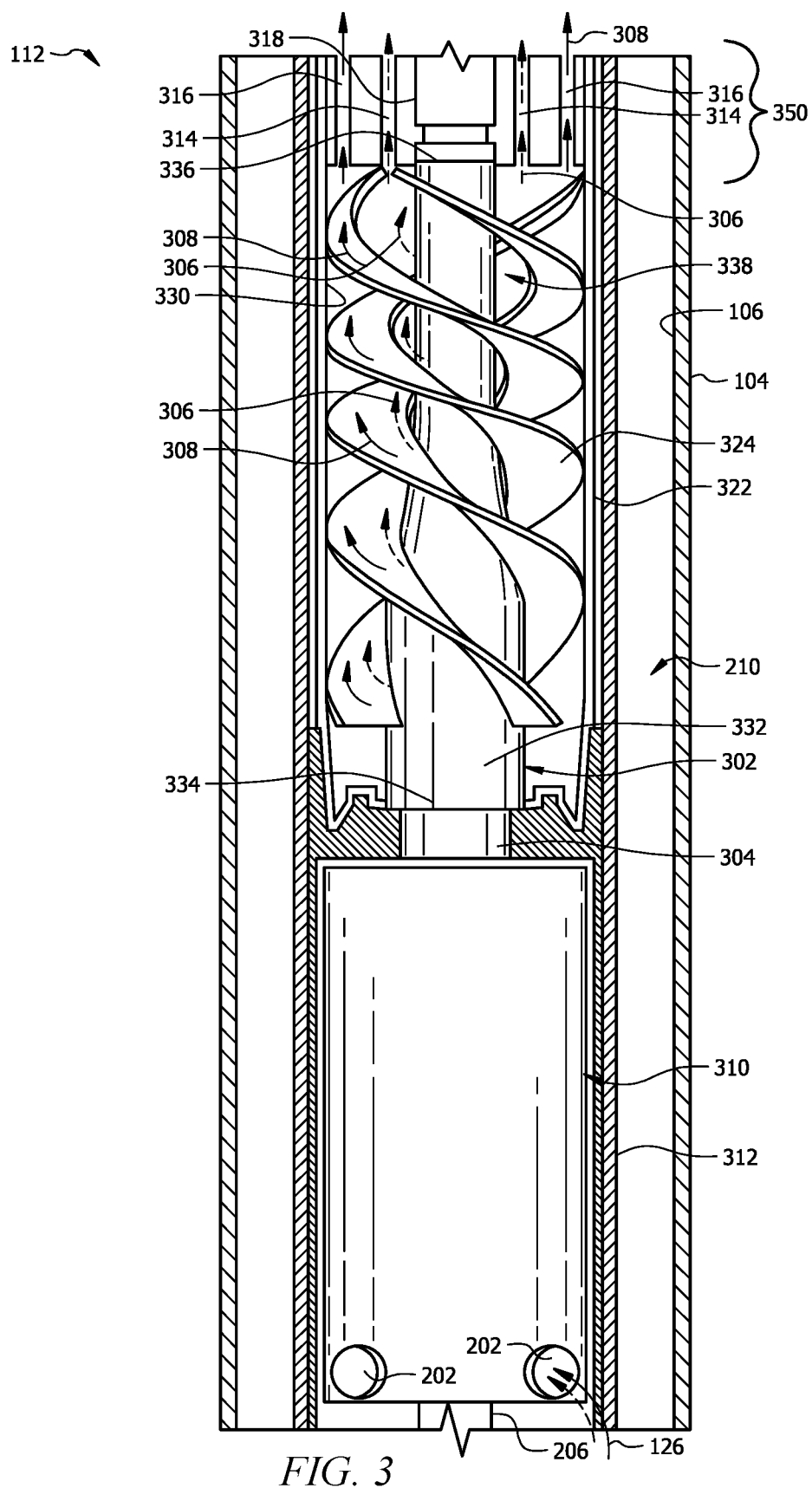
FIG. 3 is a partial cross-sectional view of an illustrative gas separator of the pump system of FIG. 2, according to one or more aspects of the present disclosure.

FIG. 3 is a partial cross-sectional view of an illustrative gas separator 112 of a pump system 150 (referring to FIG. 1), according to one or more aspects of the present disclosure. Gas separator 112 may couple to one or more other components, for example, to pump 108 (referring to FIG. 1) via a shaft 318. In one or more embodiments, shaft 318 runs through any one or more couplings 206. Gas separator 112 may be disposed or positioned within, coupled to, or otherwise associated with an outer housing 312 of a downhole tool or system. In one or more embodiments, outer housing 312 may comprise or function as the housing 212 of FIG. 2. Gas separator 112 may comprise a fluid mover 310, a stationary auger 302 and one or more discharge ports 314 and 316. Fluid mover 310 may be any type of fluid mover, for example, a rotating auger, an impeller, an impeller and a diffuser system, or any other type of fluid mover. Fluid mover 310 may comprise or be coupled to one or more intake ports 202 disposed or positioned circumferentially about a distal end of the fluid mover 310. The one or more intake ports 202 allow intake of fluid 126 from annulus 210 into the fluid mover 310 which communicates or flows the fluid 126 to the stationary auger 302. In one or more embodiments, rotating shaft 304 may run through shaft 318 or may be the same as shaft 318. The rotating shaft 304 may be driven by the motor 116 (referring to FIG. 1). For example, when the motor 116 is energized, such as by a command from the controller 120 (referring to FIG. 1) communicated to the motor 116 via electrical cable 110 (referring to FIG. 1), the rotating shaft 304 may rotate. The rotating shaft 304 extends through the fluid mover 310 and the stationary auger 302 to drive the pump 108 coupled to the gas separator 112. In one or more embodiments, the fluid mover 310 is coupled to the rotating shaft 304 and the motor 116.

In one or more embodiments, the stationary auger 302 is disposed or positioned within a separation chamber 330. The fluid mover 310 may couple to the separation chamber 330 at a downhole or distal end of the separation chamber 330. In one or more embodiments, the stationary auger 302, the separation chamber 330 or both are fluidically coupled to the one or more intake ports 202. For example, the separation chamber 330, the stationary auger 302 or both may be coupled to the fluid mover 310 via a support or other device including, but not limited to, the rotating shaft 304. Fluid mover 310 communicates or forces fluid 126 received at the one or more intake ports 202 through the separation chamber 330, stationary auger 302 or both. In one or more embodiments, the stationary auger 302 is coupled to a sleeve 322 such that the sleeve 322 maintains the stationary auger 302 in a stationary, non-rotating position. The sleeve 322 may be disposed or positioned within the separation chamber 330 or the outer housing 312. In embodiments, the rotating shaft 304 may rotate within the stationary auger 302 while the stationary auger 302 maintains a stationary, non-rotating position.

In one or more embodiments, the stationary auger 302 comprises one or more helixes or vanes 324. Without limitations, any suitable number of helixes or vanes 324 may be used in accordance with the present disclosure. In one or more embodiments, the helixes or vanes 324 may be crescent-shaped. In one or more embodiments, the stationary auger 302 comprises one or more helixes or vanes 324 disposed about an open core (for example, a coreless auger or an auger flighting). The stationary auger 302 may cause the fluid 126 to be separated into a liquid phase 308 and gas phase 306 based, at least in part, on rotational flow of the fluid 126. For example, the one or more helixes or vanes 324 may impart rotation on the fluid 126 as the fluid 126 flows through, across or about the one or more helixes or vanes 324. For example, fluid mover 310 forces the fluid 126 at a velocity or flow rate into the separation chamber 330 and up or across the one or more helixes or veins 324 of stationary auger 302.

The induced rotation of the fluid 126 by the stationary auger 302 may be based, at least in part, on the velocity or flow rate of the fluid 126 from the fluid mover 310. For example, the fluid mover 310 may increase the flow rate or velocity of the fluid 126 to increase rotation of the fluid 126 through the stationary auger 302 to create a more efficient and effective separation of the fluid 126 into a plurality of phases, for example, the liquid phase 308 and the gas phase 306. As the fluid 126 flows through the stationary auger 302, centrifugal forces, static friction or both, cause the heavier component of the fluid 126, the liquid phase 308, to circulate along an outer perimeter of the stationary auger 302 while the lighter component of the fluid 126, the gas phase 306, is circulated along an inner perimeter of the stationary auger 302. In one or more embodiments, fluid 126 may begin to separate into a gas phase 306 and a liquid phase 308 while flowing through the fluid mover 310 and may continue to separate while flowing through stationary auger 302. In one or more embodiments, the liquid phase 308 may comprise residual gas that did not separate into the gas phase 306. However, the embodiments discussed herein minimize this residual gas to protect the pump 108 from gas build-up or gas lock. In one or more embodiments, the induced vortex in the separation chamber 330 may aid in separation of the fluid 126 into the gas phase 306 and liquid phase 308.

In one or more embodiments, the separated fluid (for example, liquid phase 308 and gas phase 306) is directed to an inlet 350 of a crossover, wherein the crossover is configured to direct the liquid phase 308 and gas phase 306 away from the stationary auger 302. For example, the inlet 350 of the crossover may be disposed or positioned at an uphole or a proximal end of the separation chamber 330 or outer housing 312. For example, the inlet 350 of the crossover may be fluidically coupled the separation chamber 330 or otherwise direct one or more components or phases of fluid 126 to the pump 108 and subsequently to the annulus 210. The crossover may comprise a plurality of channels, for example, a gas phase discharge port 314 (a first pathway) and a liquid phase discharge port 316 (a second pathway). The gas phase 306 of the fluid 126 may be discharged through the gas phase discharge port 314 and the liquid phase 308 of the fluid 126 may be discharged through the liquid phase discharge port 316. In one or more embodiments, gas phase discharge port 314 may correspond to any one or more discharge ports 204 of FIG. 2. In one or more embodiments, any one or more of the gas phase discharge ports 314 and the one or more liquid phase discharge ports 316 may be defined by a channel or pathway having an opening, for example, a teardrop shaped opening. In certain embodiments, the separation chamber 330 may aid in directing the gas phase 306 and liquid phase 308 to the gas phase discharge port 314 and the liquid phase discharge port 316, respectively.

In one or more embodiments, gas separator 112 may employ an inverted venture principle where there may be an increase in pressure of the fluid 126 at it passes through the stationary auger 302. The gas separator 112 may enhance the two-phase fluid separation characteristics by increasing the flow area which allows the gas phase 306 of fluid 126 to better separate from the liquid phase 308. A combination of radial and centrifugal forces together with axial velocity may be enhanced by opening the flow area with the one or more helixes or vanes 324. In embodiments, the stationary auger 302 may comprise a hub 332, wherein the hub 332 may generally be a cylindrical hollow shaft, wherein the one or more helixes or vanes 324 may be disposed on and around the hub 332. As illustrated, the diameter of the hub 332 may taper towards a proximal end of the stationary auger 302. The hub 332 comprises a first end 334 and a second end 336 opposite to the first end 334. Rotating shaft 318 may pass through the hub 332. The hub 332 of the auger 302 may protect the shaft 318 from the fluid 126 and separates well fluid 126 from any rotational velocity from the shaft 318. As shown, the outside diameter of the hub 332 at the first end 334 may be greater than the outside diameter of the hub 332 at the second end 336, thereby resulting in a tapered diameter for the hub 332. In one or more embodiments, the one or more helixes or vanes 324 disposed about the first end 334 may be disposed at a different angle, with relation to a central axis, or vertical axis, of the hub 332, than the one or more helixes or vanes 324 disposed about the second end 336. For example, those disposed about the first end 334 may comprise an angle "A"° while those disposed about the second end 336 may comprise an angle "B"°. Without limitations, the angle of the one or more helixes or vanes 324 disposed about the first end 334 (for example, angle A) may be from about 20° to about 70°. Without limitations, the angle of the one or more helixes or vanes 324 disposed about the second end 336 (for example, angle B) may be from about 20° to about 70°. In embodiments, angle A° may be equal to or greater than angle B°. The present disclosure is not limited to such example angles, and any suitable angle may be used for the one or more helixes or vanes 324. The angle of the one or more helixes or vanes 324 disposed about the first end 334 may be associated with the direction of the fluid 126 exiting from the fluid mover 310 below, and the angle of the one or more helixes or vanes 324 disposed about the second end 336 may allow for an efficient transfer of the gas phase 306 and the liquid phase 308 into the flow paths of the inlet 350 of the crossover. In further embodiments, the angle of the one or more helixes or vanes 324 closest to the inlet 350 of the crossover may be designed to improve the efficiency of discharging the gas phase 306 and the liquid phase 308.

In one or more embodiments, there may be an opening 338 disposed between the one or more helixes or vanes 324 and the hub 332. As illustrated, the opening 338 may increase in cross-sectional area as the one or more helixes or vanes 324 approach the second end 336. For example, there may not be any opening 338 for the first one of the one or more helixes or vanes 324, but as the one or more helixes or vanes 324 are arranged along the length of the hub 332, the opening 338 may be initiated and increase in shape and size closer to the second end 336 of the hub 332. The opening 338 may be where the one or more helixes or vanes 324 are not attached or are separated from the hub 332. In embodiments, the opening 338 may allow the gas within the fluid 126 to break out into the gas phase 306 and provide a path for the gas phase 306 to flow to the gas phase discharge port 314. The increased pressure resulting from the larger surface area of the opening 338 may aid in the gas phase 306 escaping out the gas phase discharge port 314. An inside diameter of the one or more helixes or vanes 324 may increase from the first end 334, thereby leaving a radial void (for example, opening 338) between the outside diameter of the hub 332 and inside diameter of the one or more helixes or vanes 324. In embodiments, this may create a stationary space for gas to separate and start moving upwards from the fluid 126 between the first end 334 and the second end 336. In one or more embodiments, the opening 338 may be initiated at about a halfway or central location along the length of the hub 332. In one or more embodiments, an outer diameter of the one or more helixes or vanes 324 may be coupled to the sleeve 322. In further embodiments, as the cross-sectional area of the opening increases along the length of the hub 332, the opening 338 may further increase in size, shape, cross-sectional area, and combinations thereof due to the tapered diameter of the hub 332. As illustrated, the opening 338 may be a detachment of the one or more helixes or vanes 324 at least partially located at the second end 336.

In one or more embodiments, the fluid mover 310 may receive in fluid 126 through one or more intake ports 202. In one or more embodiments, the fluid mover 310 may comprise a rotating auger, wherein the fluid mover 310 comprises an auger sleeve disposed or positioned circumferentially within the fluid mover 310. A rotating auger may be disposed or positioned within the auger sleeve such that the rotating auger rotates freely within the auger sleeve. When the motor 116 causes the rotating auger to rotate, fluid 126 is drawn into the fluid mover 310 through one or more intake ports 202 and into the separation chamber 330 where the fluid 126 is separated into different phases.

In one or more embodiments, the fluid mover 310 may comprise one or more impellers and/or one or more diffusers. While a fluid mover 310 may comprises one or more impellers and/or one or more diffusers, the present disclosure contemplates any type of fluid mover. Fluid 126 moving into the fluid mover 310 may comprise a plurality of phases, for example, a gas phase and a liquid phase. These phases may be mixed together, integrated, or otherwise substantially not separated at the one or more intake ports 202, for example, as illustrated as a fluid 126. The fluid mover 310 may cause the received fluid 126 to flow at a flow rate or velocity through the fluid mover 310. Fluid 126 may be forced or flowed into the separation chamber 330 at a flow rate or velocity based, at least in part, on the rotation of one or more impellers. In one or more embodiments, the fluid 126 may begin to separate in the fluid mover 310 as the velocity or flow rate is increased while in one or more other embodiments, the fluid 126 may remain substantially or partially mixed. The fluid 126 may enter the separation chamber 330 and is forced to flow through, across, around or about the one or more vanes or helixes 324 of the stationary auger 302.

As the fluid 126 flows, for example, in an induced rotational flow pattern, through the stationary auger 302, the fluid 126 may begin to separate into the gas phase 306 and the liquid phase 308. The gas phase 306 may comprise all or substantially all of a gas from the fluid 126 and liquid phase 308 may comprise all or substantially all of a liquid from the fluid 126. Centrifugal forces, static friction or both cause the heavier liquid phase 308 to travel along an outer perimeter of the stationary auger 302 while the lighter gas phase 306 may flow along an inner perimeter or closer to the center of the stationary auger 302 within the opening 338 between the hub 332 and the one or more helixes or vanes 324. The greater the velocity or flow rate of the fluid 126, the better the separation of the fluid 126 into the gas phase 306 and the liquid phase 308.

When the gas phase 306 and the liquid phase 308 approach the inlet 350 of the crossover, each of the gas phase 306 and the liquid phase 308 are directed to different discharge ports. In one or more embodiments, the gas phase 306 is directed to a gas discharge port 314 and the liquid phase 308 is directed to a liquid discharge port 316. For example, the pump 108 may create a pressure differential between the gas separator 112 and the annulus 210. A gas phase 306 naturally flows toward a low-pressure area or zone. That is, the gas separator 112 is at a higher pressure than the annulus 210 which causes the gas phase 306 to naturally flow to the annulus 210. An intake of pump 108 may be hydraulically and mechanically connected to the gas separator 112 and may receive the liquid phase 308. As discussed above, the liquid phase 308 may comprise a liquid and any residual gas not separated by the gas separator 112.

As the gas phase 306 and the liquid phase 308 come into contact with more surface area within the stationary auger 302 and the sleeve 322, resistance to flow may be greater due to surface tension. In one or more embodiments, one or more portions of the stationary auger 302 may be coated with a friction reducer, for example, a plastic including, but not limited to, a synthetic polymer such as polytetrafluoroethylene. As the gas phase 306 and liquid phase 308 circulate through or about the stationary auger 302, the gas phase 306 flows along an inner perimeter of the stationary auger 302 while the heavier liquid phase 308 flows along an outer perimeter of the stationary auger 302. As the gas phase 306 and liquid phase 308 circulate across, through or about the stationary auger 302, separation between the two phases increases such that at the inlet 350 of the crossover, the gas phase 306 is discharged through the gas phase discharge port 314 or first pathway while the liquid phase 308 is discharged through the liquid phase discharge port 316 or second pathway. In this way, the portion of fluid 126 that is discharged to the pump 108 is substantially a liquid, liquid phase 308, such that the pump 108 is not subjected to the harmful effects of a gas, the gas phase 306, of the fluid 126.

Figure 4:
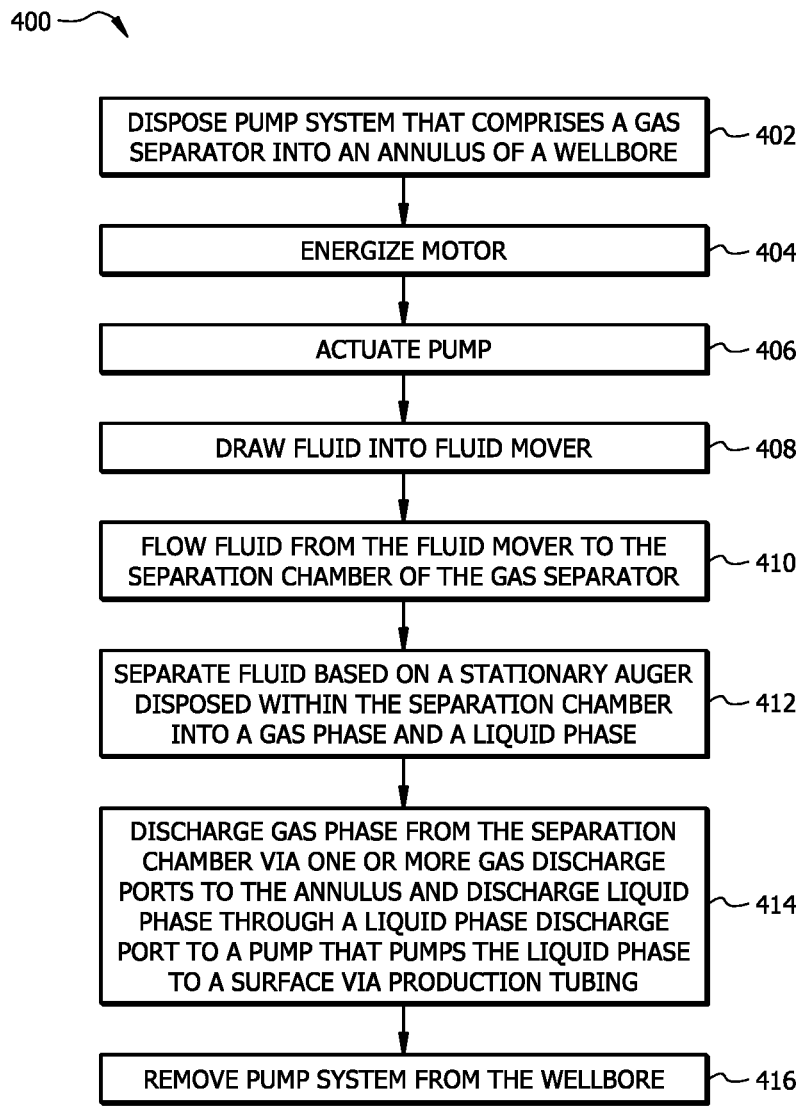
FIG. 4 is a flow chart illustrating a method of separating a fluid using the gas separator of FIG. 3, according to one or more aspects of the present disclosure.

FIG. 4 is a flow chart illustrating a method 400 for separating a fluid 126 (referring to FIG. 1) using a pump system 150 (referring to FIG. 1), according to one or more aspects of the present disclosure. At step 402, a pump system 150 is positioned or disposed in a wellbore 104 (referring to FIG. 1) where the pump system 150 comprises a gas separator 112 (referring to FIG. 1). In one or more embodiments, the pump system 150 may be part of or included with a downhole tool. The pump system 150 may be positioned or disposed such that one or more portions of the pump system 150 are submerged in or otherwise adjacent to a fluid 126.

At step 404, motor 116 (referring to FIG. 1) is energized. Energizing motor 116 causes the rotating shaft 304 (referring to FIG. 3) to rotate. Rotation of the shaft 304 drives the pump 108 (referring to FIG. 1). At step 406, pump 108 is actuated based on the motor 116 and the rotating shaft 304. Actuation of the pump 108 reduces pressure at the one or more intake ports 202 (referring to FIG. 2) such that at step 408, fluid in the wellbore 104, for example, fluid 126, is induced, moved or flowed into the one or more intake ports 202 and into the fluid mover 310 (referring to FIG. 3) of the gas separator 112.

At step 410, the fluid 126 is flowed from the fluid mover 310 to the separation chamber 330 (referring to FIG. 3) of the gas separator 112. For example, fluid 126 is forced through the fluid mover 310 and into the separation chamber 330, for example, as discussed above with respect to FIG. 3. At step 412, as the fluid 126 travels through the separation chamber 330, the stationary auger 302 (referring to FIG. 3) disposed or positioned within the separation chamber 330 causes a separation of the fluid 126 into the gas phase 306 (referring to FIG. 3) and the liquid phase 308 (referring to FIG. 3). The gas phase 306 is lighter than the liquid phase 308 and travels along an inner perimeter of the one or more vanes 324 (referring to FIG. 3) of the stationary auger 302 while the heavier liquid phase 308 travels along an outer perimeter of the one or more vanes 324 of the stationary auger 302. In embodiments, the gas phase 306 may travel within the opening 338 (referring to FIG. 3) between the hub 332 (referring to FIG. 3) and the one or more helixes or vanes 324 For example, the liquid phase 308 may travel about the outer perimeter of the stationary auger 302 such that the liquid phase 308 contacts sleeve 322 (referring to FIG. 3) of the separation chamber 330.

At step 414, the gas phase 306 is discharged from the separation chamber 330 via one or more gas phase discharge ports 314 (referring to FIG. 3) of the inlet 350 of the crossover (referring to FIG. 3) and the liquid phase 308 is discharge from the separation chamber 330 via one or more liquid phase discharge ports 316 (referring to FIG. 3) of the inlet 350. In one or more embodiments, the gas phase 306 is discharged into the annulus 210 (referring to FIG. 2). In one or more embodiments, the liquid phase 306 is discharged via one or more liquid phase discharge ports 316 to the pump 108, and the pump 108 pumps the liquid phase 308 to the surface 102 (referring to FIG. 1), for example, via tubing 122 (referring to FIG. 1). At step 416, pump system 150 may be removed from the wellbore 104, and the method 400 may proceed to end.

According to one or more aspects of the present disclosure, the pump system 150 improves the two-phase separation efficiency of a traditional helical design by reducing the hub diameter with a taper and detaching the helix vanes 324 with the opening 338 from the hub 332 in the course of fluid flow as it travels through the final path of the helix 324. The design, by means of increased radial area for the liquid phase 308 and increased axial area for the gas phase 306, improves the separating efficiency of the entire system.

An embodiment of the present disclosure is a gas separator for separating a downhole fluid that comprises an intake port, wherein the intake port is configured to receive a downhole fluid; a fluid mover fluidically coupled to the intake port; and a stationary auger fluidically coupled to the fluid mover, wherein the stationary auger separates the downhole fluid into a gas phase and a liquid phase based, at least in part, of the downhole fluid. The stationary auger comprises a hub, wherein the hub comprises a tapered diameter, wherein the tapered diameter of the hub is configured such that a diameter at a first end is greater than the diameter at a second end; one or more helixes or vanes disposed around the hub; and an opening disposed between a portion of the one or more helixes or vanes, wherein the opening is a detachment of the one or more helixes or vanes at the second end. The gas separator further comprises a first pathway fluidically coupled to the stationary auger, wherein the gas phase is directed through the first pathway and a second pathway fluidically coupled to the first pathway, wherein the liquid phase is directed through the second pathway.

In one or more embodiments described in the preceding paragraph, wherein an angle of the one or more helixes or vanes disposed about the first end of the hub is selected from a range from about 20° to about 70°. In one or more embodiments described above, wherein an angle of the one or more helixes or vanes disposed about the second end of the hub is selected from a range from about 20° to about 70°, wherein the angle of the one or more helixes or vanes disposed about the first end of the hub is greater than the angle of the one or more helixes or vanes disposed about the second end of the hub in relation to a central axis of the hub. In one or more embodiments described above, wherein the fluid mover comprises an impeller, an impeller and a diffuser, or a rotating auger. In one or more embodiments described above, further comprising a separation chamber, wherein the separation chamber is fluidically coupled to the stationary auger and the stationary auger is disposed within the separation chamber. In one or more embodiments described above, further comprising a sleeve coupled to the stationary auger, wherein the sleeve maintains the stationary auger in a non-rotating position. In one or more embodiments described above, further comprising a rotating shaft, wherein the rotating shaft runs through the stationary auger to a pump.

Another embodiment of the present disclosure is a method of separating a fluid into a plurality of phases, comprising: receiving at an intake port a fluid; flowing the fluid through a stationary auger fluidically coupled to the intake port; inducing rotation of the fluid based, at least in part, on the stationary auger; separating the fluid into a liquid phase and a gas phase as the fluid flows through the stationary auger, wherein the gas phase is configured to separate into an opening disposed between one or more helixes or vanes disposed around a hub of the stationary auger and the hub, wherein the hub comprises a tapered diameter, wherein the tapered diameter of the hub is configured such that a diameter at a first end is greater than the diameter at a second end; discharging the gas phase through a first pathway, wherein the opening is a detachment of the one or more helixes or vanes at the second end; and discharging the liquid phase through a second pathway.

In one or more embodiments described in the preceding paragraph, wherein an angle of the one or more helixes or vanes disposed about the first end of the hub is selected from a range from about 20° to about 70°. In one or more embodiments described above, wherein an angle of the one or more helixes or vanes disposed about the second end of the hub is selected from a range from about 20° to about 70°, wherein the angle of the one or more helixes or vanes disposed about the first end of the hub is greater than the angle of the one or more helixes or vanes disposed about the second end of the hub in relation to a central axis of the hub. In one or more embodiments described above, further comprising: receiving at a fluid mover the fluid from the intake port; and forcing, by the fluid mover, the fluid at a flow rate to flow to the stationary auger, wherein the rotation of the fluid is based, at least in part, on the flow rate. In one or more embodiments described above, wherein the fluid mover comprises an impeller, an impeller and a diffuser, or a rotating auger. In one or more embodiments described above, further comprising maintaining the stationary auger in a stationary position using a sleeve coupled to the stationary auger. In one or more embodiments described above, wherein the gas phase is discharged through the first pathway into an annulus and the liquid phase is discharged through the second pathway to a pump.

A further embodiment of the present disclosure is a pump system, comprising: a pump; and a gas separator coupled to the pump, wherein the gas separator comprises: an intake port, wherein the intake port is configured to receive a downhole fluid; a fluid mover fluidically coupled to the intake port; a stationary auger fluidically coupled to the fluid mover, wherein the stationary auger separates the downhole fluid into a gas phase and a liquid phase based, at least in part, of the downhole fluid, wherein the stationary auger comprises: a hub, wherein the hub comprises a tapered diameter, wherein the tapered diameter of the hub is configured such that a diameter at a first end is greater than the diameter at a second end; one or more helixes or vanes disposed around the hub; and an opening disposed between a portion of the one or more helixes or vanes a first pathway fluidically coupled to the stationary auger, wherein the opening is a detachment of the one or more helixes or vanes at the second end, wherein the gas phase is directed through the first pathway; and a second pathway fluidically coupled to the stationary auger, wherein the liquid phase is directed through the second pathway.

In one or more embodiments described in the preceding paragraph, wherein an angle of the one or more helixes or vanes disposed about the first end of the hub is selected from a range from about 20° to about 70°. In one or more embodiments described above, wherein an angle of the one or more helixes or vanes disposed about the second end of the hub is selected from a range from about 20° to about 70°, wherein the angle of the one or more helixes or vanes disposed about the first end of the hub is greater than the angle of the one or more helixes or vanes disposed about the second end of the hub in relation to a central axis of the hub. In one or more embodiments described above, wherein the fluid mover comprises an impeller, an impeller and a diffuser, or a rotating auger, and wherein the pump comprises one of a rod pump or a progressive cavity pump. In one or more embodiments described above, wherein the stationary auger is coupled to a sleeve, wherein the sleeve maintains the stationary auger in a non-rotating position. In one or more embodiments described above, wherein the gas separator further comprises a separation chamber fluidically coupled to the intake port, wherein at least one of the stationary auger is disposed within the separation chamber and the separation chamber is fluidically coupled to the stationary auger.

Unless indicated to the contrary, the numerical parameters set forth in the specification and attached claims are approximations that may vary depending upon the desired properties sought to be obtained by the embodiments of the present disclosure. At the very least, and not as an attempt to limit the application of the doctrine of equivalents to the scope of the claim, each numerical parameter should at least be construed in light of the number of reported significant digits and by applying ordinary rounding techniques.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The disclosure illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:

1. A gas separator for separating a downhole fluid, comprising:
    an intake port, wherein the intake port is configured to receive a downhole fluid;
    a fluid mover fluidically coupled to the intake port;
    a stationary auger fluidically coupled to the fluid mover, wherein the stationary auger separates the downhole fluid into a gas phase and a liquid phase based, at least in part, on the downhole fluid, wherein the stationary auger comprises:
        a hub, wherein the hub comprises a tapered diameter, wherein the tapered diameter of the hub is configured such that a diameter at a first end is greater than the diameter at a second end;
        one or more helixes or vanes disposed around the hub; and
        an opening disposed between a portion of the one or more helixes or vanes, wherein the opening is a detachment of the one or more helixes or vanes at the second end;
    a first pathway fluidically coupled to the stationary auger, wherein the gas phase is directed through the first pathway; and
    a second pathway fluidically coupled to the first pathway, wherein the liquid phase is directed through the second pathway.

2. The gas separator of claim 1, wherein an angle of the one or more helixes or vanes disposed about the first end of the hub is selected from a range from about 20° to about 70°.

3. The gas separator of claim 2, wherein an angle of the one or more helixes or vanes disposed about the second end of the hub is selected from a range from about 20° to about 70°, wherein the angle of the one or more helixes or vanes disposed about the first end of the hub is greater than the angle of the one or more helixes or vanes disposed about the second end of the hub in relation to a central axis of the hub.

4. The gas separator of claim 1, wherein the fluid mover comprises an impeller, an impeller and a diffuser, or a rotating auger.

5. The gas separator of claim 1, further comprising a separation chamber, wherein the separation chamber is fluidically coupled to the stationary auger and the stationary auger is disposed within the separation chamber.

6. The gas separator of claim 1, further comprising a sleeve coupled to the stationary auger, wherein the sleeve maintains the stationary auger in a non-rotating position.

7. The gas separator of claim 1, further comprising a rotating shaft, wherein the rotating shaft runs through the stationary auger to a pump.

8. A pump system, comprising:
    a pump; and
    a gas separator coupled to the pump, wherein the gas separator comprises:
        an intake port, wherein the intake port is configured to receive a downhole fluid;
        a fluid mover fluidically coupled to the intake port;
        a stationary auger fluidically coupled to the fluid mover, wherein the stationary auger separates the downhole fluid into a gas phase and a liquid phase based, at least in part, on the downhole fluid, wherein the stationary auger comprises:
            a hub, wherein the hub comprises a tapered diameter, wherein the tapered diameter of the hub is configured such that a diameter at a first end is greater than the diameter at a second end;
            one or more helixes or vanes disposed around the hub; and
            an opening disposed between a portion of the one or more helixes or vanes, wherein the opening is a detachment of the one or more helixes or vanes at the second end;
        a first pathway fluidically coupled to the stationary auger, wherein the gas phase is directed through the first pathway; and
        a second pathway fluidically coupled to the stationary auger, wherein the liquid phase is directed through the second pathway.

9. The system of claim 8, wherein an angle of the one or more helixes or vanes disposed about the first end of the hub is selected from a range from about 20° to about 70°.

10. The system of claim 9, wherein an angle of the one or more helixes or vanes disposed about the second end of the hub is selected from a range from about 20° to about 70°, wherein the angle of the one or more helixes or vanes disposed about the first end of the hub is greater than the angle of the one or more helixes or vanes disposed about the second end of the hub in relation to a central axis of the hub.

11. The system of claim 8, wherein the fluid mover comprises an impeller, an impeller and a diffuser, or a rotating auger, and wherein the pump comprises one of a rod pump or a progressive cavity pump.

12. The system of claim 8, wherein the stationary auger is coupled to a sleeve, wherein the sleeve maintains the stationary auger in a non-rotating position.

13. The system of claim 8, wherein the gas separator further comprises a separation chamber fluidically coupled to the intake port, wherein at least one of the stationary auger is disposed within the separation chamber and the separation chamber is fluidically coupled to the stationary auger.

* * * * *